US005939469A

United States Patent [19]

Fussnegger et al.

[11] Patent Number: 5,939,469

[45] Date of Patent: Aug. 17, 1999

[54] COATING MATERIALS FOR INK-JET PRINTING

[75] Inventors: Bernhard Fussnegger, Kirrweiler; Manfred Baumeister, Bobingen, both of Germany

[73] Assignee: BASF Aktiengesellschaft, Ludwigshafen, Germany

[21] Appl. No.: 08/839,812

[22] Filed: Apr. 18, 1997

[30] Foreign Application Priority Data

Apr. 25, 1996 [DE] Germany .......................... 196 16 529

[51] Int. Cl.[6] .................................................. C08F 126/06

[52] U.S. Cl. .......................................... 523/161; 428/511

[58] Field of Search ............................................ 428/511

[56] References Cited

U.S. PATENT DOCUMENTS 4,451,582 5/1984 Denzinger et al. ...................... 521/38

FOREIGN PATENT DOCUMENTS

| | | |
|---|---|---|
| 487 349 | 5/1992 | European Pat. Off. . |
| 698500 | 2/1996 | European Pat. Off. . |
| 767072 | 4/1997 | European Pat. Off. . |
| 63307979 | 6/1987 | Japan . |
| 1009776 | 7/1987 | Japan . |
| 6092007 | 9/1992 | Japan . |
| 6143800 | 11/1992 | Japan . |
| 2075034 | 11/1981 | United Kingdom . |
| 2156367 | 10/1985 | United Kingdom . |

*Primary Examiner*—Edward J. Cain
*Attorney, Agent, or Firm*—Keil & Weinkauf

[57] ABSTRACT

Ink-jet-printable material in which a base is coated with a polymer of (a) 50 to 99.5% by weight of at least one basic vinyl heterocycle having a pKa of at least 3.8, (b) 0 to 49.5% by weight of a further copolymerizable monomer, and (c) 0.5 to 10% by weight of a crosslinker.

10 Claims, No Drawings

COATING MATERIALS FOR INK-JET PRINTING

The invention relates to the use of a polymer based on a basic vinyl heterocycle having a $pK_a$ of at least 3.8 for coating printable materials, especially for coating plastic film and paper which is intended for ink-jet printing.

Ink-jet inks are solutions of anionic dyes in water or aqueous organic mixtures. To prepare a printed product, these inks are sprayed in dot form onto a printable surface. To prevent the size and shape of the applied ink dots altering as a result of the ink running, and to prevent the edges becoming indefinite, it is necessary to fix the inks immediately on their application. This is done by fixing the anionic dyes on polymers with which the printable materials have been coated beforehand. The ink binds to the polymers either ionically (cationic polymers) or by way of $\pi$—$\pi$ interactions (neutral polymers).

Dye-fixing components used to date include soluble cationic polymers, predominantly of the quaternary ammonium compound type. These are formulated with absorbent pigments onto which they are absorbed.

JP 06143800 describes a silica gel in combination with a quaternary polyethyleneimine, where a two-layer structure of the components is intended.

JP 06092007 proposes at the actual papermaking stage using as filler a calcium carbonate treated with a formulation including a copolymer of trimethylammonium methacrylate and vinyl alcohol.

EP 487 349 describes silica gel particles which have been treated with a cationic polyamine (Cypro 514®).

JP 01009776 proposes for this purpose the cationic copolymer of diallyldimethylammonium chloride and acrylamide.

JP 63307979 proposes giving paper for ink-jet printing a coating of a hydrophilic soluble copolymer of vinylimidazole, vinylpyrrolidone and vinylbenzylsulfonic acid (60:30:10).

A disadvantage of the types of coating described above is that all of them require two components which accomplish dye binding and solvent fixation either by absorption into a three-dimensional, porous cavity system or by an increase in viscosity. In the case of JP 63307979, the porous system is produced by the crosslinking of gelatin with 1,4-butanediol diglycidyl ether. The key disadvantage is the reactivity of this constituent. Following the addition of water and the beginning of the crosslinking reaction, the formulation can be processed in the coating units for only a short time.

It is an object of the present invention, therefore, to provide polymers which are suitable for coating printable materials and do not possess the disadvantages mentioned above.

We have found that this object is achieved by the subject-matter of the invention, which provides for the use of a polymer of (a) 50 to 99.5% by weight of at least one basic vinyl heterocycle having a $pK_a$ of at least 3.8, (b) 0 to 49.5% by weight of a further copolymerizable monomer, and (c) 0.5 to 10% by weight of a crosslinker for coating printable materials, and by the embodiments set out further in the subclaims.

In EP-A-4 38 713, polymers of this kind are used to remove heavy metals from wine and similar beverages. As regards the preparation of the polymers, express reference is made to this document.

The basic vinyl heterocycles (a) are in this case saturated and aromatically unsaturated heterocycles having a vinyl group and at least one basic tertiary ring nitrogen, with a $pK_a$ of at least 3.8. In addition to vinyl, the ring may also carry alkyls of 1 to 4 carbons, phenyls or benzyls, or even a second, fused-on ring. Examples of such heterocycles (a) are N-vinylimidazole (VI) and derivatives thereof, such as 2-methyl-1-vinylimidazole, 4-methyl-1-vinylimidazole, 5-methyl-1-vinylimidazole, 2-ethyl-1-vinylimidazole, 2-propyl-1-vinylimidazole, 2-isopropyl-1-vinylimidazole, 2-phenyl-1-vinylimidazole and 1-vinyl-4,5-benzimidazole. Further examples of usable compounds are 2-vinylpyridine, 4-vinylpyridine and 2-methyl-5-vinylpyridine. It is of course also possible to employ mixtures of basic vinyl heterocycles with one another.

Preferred monomers (a) are N-vinylimidazole and 2-methyl-N-vinylimidazole.

The monomers (a) are employed in a proportion of 50–99.5%, preferably 60–96%, based on the overall polymer weight.

Suitable crosslinkers (c) are those whose molecule includes two or more free-radically copolymerizable vinyls, especially alkylenebisacrylamides, such as methylenebisacrylamide and N,N'-bisacryloylethylenediamine, N,N'-divinylethyleneurea, N,N'-divinylpropyleneurea, ethylidene-bis-3-(N-vinylpyrrolidone) and also N,N'-divinyldiimidazolyl-(2,2')- and 1,1'-bis(3,3'-vinylbenzimidazolid-2-one)-1,4-butane. Examples of other crosslinkers which can be used are alkylene glycol di(meth)acrylates, such as ethylene glycol di(meth)acrylate and tetramethylene glycol di(meth)acrylate, aromatic divinyl compounds, such as divinylbenzene and divinyltoluene, and also allyl acrylate, divinyldioxane, pentaerythritol triallyl ether, and mixtures thereof. When polymerization is carried out in the presence of water their suitability of course depends on their ability to dissolve in the aqueous monomer mixture.

The crosslinkers (c) are employed in a proportion of 0.5–10%, preferably 1–4% based on the weight of all monomers in the polymer.

The comonomers (b) are incorporated by polymerization in proportions of up to 49.5%, preferably up to 30%, particularly preferably up to 20%, based on the weight of the total monomer mixture. Examples of suitable comonomers (b) are styrene, acrylates, vinyl esters, acrylamides and N-vinyl-dihydropyridines. Comonomers (b) used with preference are N-vinyllactams such as 3-methyl-N-vinylpyrrolidone, especially N-vinylcaprolactam and N-vinylpyrrolidone (VP).

Particularly suitable polymers for use in accordance with the invention are those of N-vinylimidazole (VI), N-vinylpyrrolidone (VP) and N,N'-divinylethyleneurea (DVEU), especially those of 80–90% by weight VI, 5–15% by weight VP and 2–5% by weight DVEU.

For polymerization without solvent the monomer mixture, consisting of basic vinyl heterocycle, crosslinking agent and, if used, N-vinyllactam or another comonomer, is rendered inert by passing nitrogen in and is subsequently heated at 100–200° C., preferably 150–180° C. It is advantageous to continue to pass a gentle stream of nitrogen into the mixture. It is particularly advantageous if the batch is brought to boiling by applying reduced pressure. Depending on the monomers used and the temperature chosen, the mixture then polymerizes within 1–20 hours. For example, in the polymerization of 2-methyl-vinylimidazole with 2% of N,N'-divinylethyleneurea at 150° C. and at 310 mbar, where the batch is stirred with a powerful stirrer, the first polymer particles are formed after 2.5 h, and gradually increase until after 10 h the batch consists of a brownish powder, which is rinsed with water and dried to give yields of more than 90% of a coarse polymer powder.

A preferred preparation technique is that of precipitation polymerization in water. The monomer concentration of the reaction mixture is expediently chosen such that the batch remains readily stirrable throughout the reaction period. If there is too little water, the polymer particles in fact become sticky, so that stirring is even more difficult than if no water at all were present. In the case of the customary stirred vessels the expedient monomer concentration, based on the aqueous mixture, is from about 5 to 30% by weight, preferably from 8 to 15% by weight. It may be raised to 50% by weight if powerful stirrers are available. It can also be expedient to start the polymerization with a relatively concentrated solution and then to dilute it with water as the reaction progresses. Polymerization is advantageously carried out at a pH of more than 6 so as to avoid possible hydrolysis of the comonomers and/or crosslinkers. The pH can be established by adding small amounts of bases, such as sodium hydroxide or ammonia, or the customary buffer salts, such as sodium carbonate, bicarbonate or phosphate. Oxygen can be excluded by keeping the polymerization mixture at boiling and/or, as mentioned, with the aid of an inert gas such as nitrogen. The temperature of polymerization here may be from to 150° C., and is preferably from 40 to 100° C.

In some instances it may be advantageous, in order to remove completely any dissolved oxygen, to add small quantities—from 0.01 to 1% by weight, based on the monomer mixture—of a reducing agent such as sodium sulfite, sodium pyrosulfite, sodium dithionite, ascorbic acid or the like either prior to or at the beginning of polymerization.

In a particularly preferred embodiment of precipitation polymerization the water-soluble comonomer (preferably NVP or an N-vinyllactam), some of the crosslinker, water and, if used, a buffer and a reducing agent are heated in a gentle stream of nitrogen until the first polymer particles are formed. Then a mixture, which has been rendered inert beforehand by blowing in nitrogen, of the vinyl heterocycle and the rest of the crosslinker and, if used, water as diluent is added over a period of 0.2–6 hours.

The start of polymerization can often be brought forward by adding from 0.01 to 5% by weight, based on the monomer mixture, of a crosslinked polymer of low swellability which is based on basic vinyl heterocycles having a $pK_a$ of at least 3.8 or vinyllactams, especially N-vinylimidazole and N-vinylpyrrolidone.

The polymer produced can be isolated from the aqueous suspension by filtration or centrifugation, then rinsed with water and dried in customary apparatus such as a convection or vacuum oven, a paddle drier or a flow drier.

For use in accordance with the invention the polymer is generally employed in amounts of 0.5–90%, preferably 2–20%, based on the total dry mass of the coating formulation. The size distribution of the polymer particles normally encompasses a range from 0.01–100 $\mu$m, preferably 0.3–20 $\mu$m.

A further constituent of the coating formulation is a binder, highly suitable examples being polyvinyl alcohols or polyvinylpyrrolidones having K values from 60 to 90.

Other possible constituents of the coating formulation are the fillers known from papermaking, such as barium sulfate, calcium carbonate, kaolin, talc, titanium dioxide and silicates.

The constituents are suspended in a liquid medium, preferably water, to a solids content which is normally from 30 to 80% and a viscosity (Brookfield) of from 100 to 3000 mPas.

This suspension is used directly to coat the materials which are to be printed, ie. especially paper, cardboard and plastic films.

The printable materials do not generally require any pretreatment before the polymer-containing coating composition is applied.

The examples which follow illustrate the invention further.

EXAMPLE 1

In a stirred vessel with reflux condenser a mixture of 50 parts of N-vinylimidazole, 30 parts of 2-methyl-l-vinylimidazole and 30 parts of N-vinylpyrrolidone to which 3 parts of N,N'-divinylethyleneurea were added was heated at 160° C. and 250 mbar. After about 90 minutes the first insoluble polymer particles appeared. 2 hours' stirring later, the reaction batch consisted of a dry powder which was subsequently washed on a suction filter and dried at 60° C. in a convection oven. The yield was 93.5%.

EXAMPLE 2

A mixture of 4 parts of N-vinylpyrrolidone, 0.1 part of N,N'-divinylethyleneurea (DVEU), 50 parts of water and 0.5 part of 5% strength sodium hydroxide solution was placed in a stirred vessel and heated to 60° C. in a stream of nitrogen. 0.01 part of sodium dithionite was added and the mixture was stirred at 70° C. for 1 h. A suspension was obtained into which a solution of 37 parts of N-vinylimidazole and 1.2 parts of DVEU in 50 parts of water was metered over a period of 3 hours. The mixture was subsequently polymerized at 70° C. for 2 hours. The product was worked up by washing on a suction filter, rinsing with water and drying at 60° C. in a convection oven, to give fine white particles in a yield of 95%.

EXAMPLE 3

In a stirred apparatus fitted with a reflux condenser, a solution of a mixture of 15 parts of N-vinyl-1,4-dihydropyridine and 15 parts of N-vinylpyrrolidone in 200 parts of water, to which 0.6 part of N,N'-divinylethyleneurea was added, was first gassed with nitrogen while stirring, at 60° C., and then 1 part of sodium dithionite was added. One hour later, a solution of 70 parts of N-vinylimidazole and 1.4 parts of N,N'-divinylethyleneurea in 200 parts of water was added to the primary suspension obtained before. The batch was heated at 80° C. with stirring and polymerized for 8 hours. The resulting precipitated polymer was separated off on a suction filter, washed carefully with water and dried at 50° C. in a vacuum oven. The yield of fine white odor-neutral powder was 94.7%.

EXAMPLE 4

10 parts of the comminuted polymer of Example 2 were incorporated into 100 parts of water together with 80 parts of calcium carbonate (95%) with a particle diameter of less than 2 $\mu$m and with 10 parts of Luviskol K 90® (polyvinylpyrrolidone) and the mixture was homogenized.

The resulting dispersion was applied as a level coating on the paper by means of a roll doctor, a coating knife, a film press, an air brush or a coating press. The amount applied was 2–15 g per $m^2$ of paper.

EXAMPLE 5

10 parts of the comminuted polymer of Example 2 were incorporated into 100 parts of water together with 75 parts of calcium carbonate (95%) with a particle diameter of less than 2 μm and with 10 parts of poly (trimethylammoniummethyl methacrylate) and 5 parts of polyvinyl alcohol Kurraray R1130® and the mixture was homogenized.

The resulting dispersion was applied as a level coating on the paper by means of a roll doctor, a coating knife, a film press, an air brush or a coating press. The amount applied was 2–15 g per $m^2$ of paper.

We claim:

1. A composition suitable for ink-jet printing, comprising a base material selected from the group consisting of paper, cardboard and plastic film; and a coating on said base material for binding anionic dyes of ink-jet inks to the base; said coating comprising (a) 50 to 99.5% of a basic vinyl heterocycle selected from the group consisting of N-vinylimidazole, 2-methyl-1-vinylimidazole and a mixture thereof; said vinyl heterocycle having a pKa of at least 3.8;

(b) 0 to 49.5% by weight of a further copolymerizable monomer; and (c) 0.5 to 10% by weight of a crosslinker.

2. The composition defined in claim 1, in which the further copolymerizable comonomer (b) is selected from the group consisting of N-vinylpyrrolidone, N-vinylcaprolactam, N-vinyl-1,4-dihydropyridine and a mixture thereof.

3. The composition defined in claim 1, in which the further copolymerizable crosslinker (c) is N,N'-divinylethyleneurea.

4. A method of producing a material suitable for ink-jet printing, which method comprises coating a substrate selected from the group consisting of paper, cardboard and plastic film; said coating comprising (a) 50 to 99.5% of a basic vinyl heterocycle having a pKa of at least 3.8;

(b) 0 to 49.5% by weight of a further copolymerizable monomer, and (c) 0.5 to 10% by weight of a crosslinker.

5. The method of claim 4, wherein the polymer is prepared in the presence of a reducing agent.

6. The method of claim 4, wherein the polymer has a particle size of from 0.01 to 100 μm.

7. The method of claim 4, wherein the polymer is prepared in the presence of water at from 30 to 150° C.

8. The method of claim 4, wherein the basic vinyl heterocycle is selected from the group consisting of N-vinylimidazole, 2-methyl-1-vinylimidazole and a mixture thereof.

9. The method of claim 4, wherein the copolymerizable comonomer is selected from the group consisting of N-vinylpyrrolidone, N-vinylcaprolactam, N-vinyl-1,4-dihydropyridine and a mixture thereof.

10. The method of claim 4, wherein the copolymerizable croslinker is N,N'-divinylethyleneurea.

* * * * *